Feb. 14, 1967  C. W. SLOAN ETAL  3,304,098
OCCUPANT-PROPELLED AMUSEMENT VEHICLE
Filed July 16, 1965  2 Sheets-Sheet 1
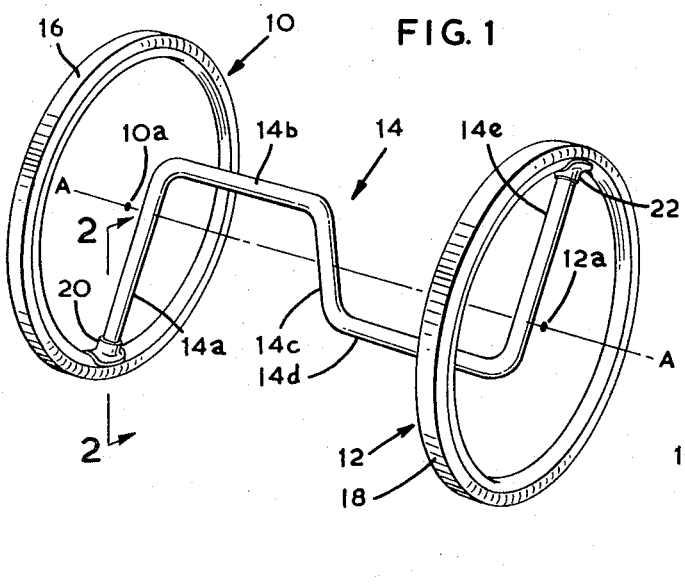
FIG. 1
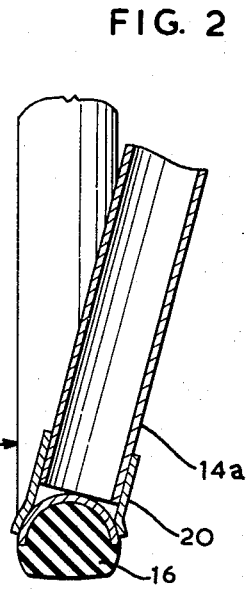
FIG. 2
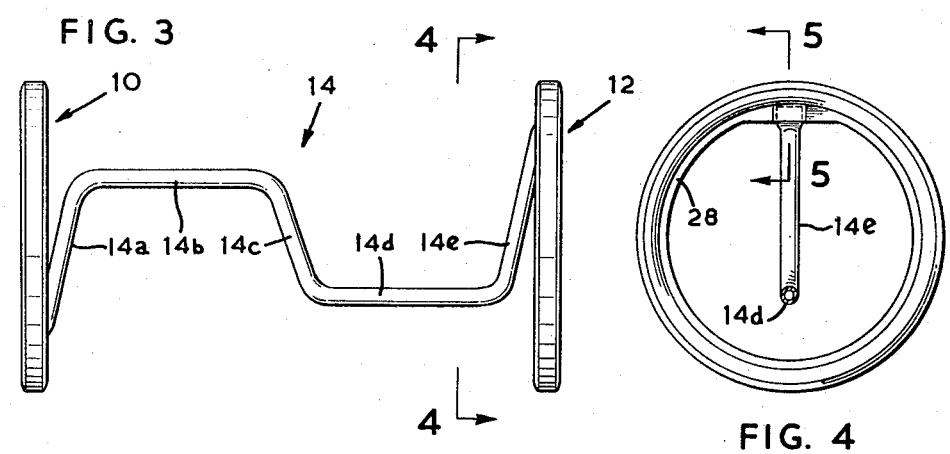
FIG. 3
FIG. 4
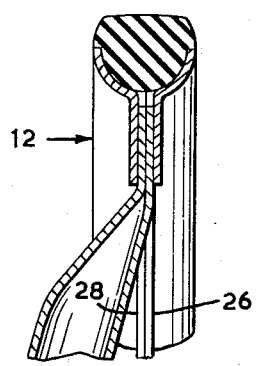
FIG. 5
*INVENTORS*
CHARLES W. SLOAN
JAMES D. ORR
BY~ *Featherstonhaugh & Co.*
ATTORNEYS Feb. 14, 1967  C. W. SLOAN ETAL  3,304,098
OCCUPANT-PROPELLED AMUSEMENT VEHICLE
Filed July 16, 1965  2 Sheets-Sheet 2

INVENTORS
CHARLES W. SLOAN
JAMES D. ORR
BY
ATTORNEYS

United States Patent Office 3,304,098
Patented Feb. 14, 1967

3,304,098
OCCUPANT-PROPELLED AMUSEMENT
VEHICLE
Charles William Sloan, 35 Marbury Crescent, Don Mills, Ontario, Canada, and James D. Orr, 1261 Stavebank Road, Port Credit, Ontario, Canada
Filed July 16, 1965, Ser. No. 472,633
10 Claims. (Cl. 280—221)

This invention relates to the manufacture of amusement devices and is particularly concerned with a wheeled device adapted to support and be propelled by a standing person.

The device of the invention essentially consists of a pair of spaced wheels interconnected by a crank mechanism which is both adapted to support a person standing thereon and to be operated by the person to propel the device. Devices of this general type have been known heretofore and the present invention is mainly concerned with an improved form of such devices characterized by simplicity of construction having the chief advantage of low manufacturing cost.

The small wheeled vehicles with which this invention is concerned appeal to both children and adults alike. They are not intended to be means of transportation as much as amusement devices having limited use on relatively firm and smooth ground surfaces such as sidewalks, roadways, etc. Being primarily amusement devices having limited utility, they must be manufactured and sold at relatively low cost. However, the devices known heretofore have been somewhat complicated in construction and due to their relative high cost of manufacture, they have met with only limited market success. Further, the known devices have suffered other disadvantages which have reduced their popularity. Some of the prior devices have employed moving parts involving potential points of wear or the use of relatively expensive bearings or bushings to reduce wear. In other cases, the devices have not been structurally sound which has proved a distinct disadvantage where the devices have been primarily used by children. Other faults of the prior devices have related to their tendency to catch pant cuffs, leading to tripping of the person propelling the devices and potentially to accidents. In this regard, certain of the devices known heretofore have placed the operator's feet too close together and in other cases, the feet have been placed too far apart or too close to the wheels. Finally, without exception, the known devices have employed either too large or too small a relative crank throw so that the operator has either had to balance himself very carefully, in the case of too large a crank throw, or has had to operate the cranks at too great a speed relative to forward motion obtained, in the case of too small a crank throw.

It is, therefore, a main object of this invention to provide a self-propelled amusement device of the type generally defined above which can be manufactured at a realistic cost having in mind the limited utility of the device and its prime function as an amusement device only.

It is a further object of this invention to provide an amusement device of this type which employs no moving parts, which is structurally sound, which spaces the feet of the operator both away from the wheels and from one another, and which employs a crank throw which permits safe and efficient operation of the device.

In accord with the invention, the above and further objects are met by an amusement device of the type defined above having a pair of spaced wheels interconnected by a one-piece crank mechanism which acts as a support for a person standing on the device and as a propelling means for the device when operated by a person supported thereon and in which the wheels essentially consist of hook-like elements having no internal support and having the ends of the crank mechanism connected to the inner circumferential faces of the wheels and in which the crank mechanism includes sloped extents at either end and an inclined extent in its middle as to space the person's feet from the wheels and from each other. As a preferred expedient, the distance between the two parts of the crank mechanism which act as feet engaging members is within 35 to 45 percent of the diameter of the wheels.

The invention will be more thoroughly understood from the following description of preferred embodiments thereof as read in conjunction with the accompanying drawings.

In the drawings which illustrate these preferred embodiments,

FIG. 1 is a perspective view of a first form of the invention characterized by a particular type of socket arrangement for effecting connection between the crank mechanism and the wheels;

FIG. 2 is an enlarged cross-sectional view taken along the line 2—2 of FIG. 1 and specifically illustrating this particular socket arrangement;

FIG. 3 is a front elevational view of a modified form of the invention shown in FIG. 1 which is characterized by a second preferred method of connecting the crank mechanism to the wheels and is also characterized by a particular construction for the wheels;

FIG. 4 is a cross-sectional view taken along the line 4—4 of FIG. 3;

FIG. 5 is an enlarged cross-sectional view taken along the line 5—5 of FIG. 4;

Figure 6:
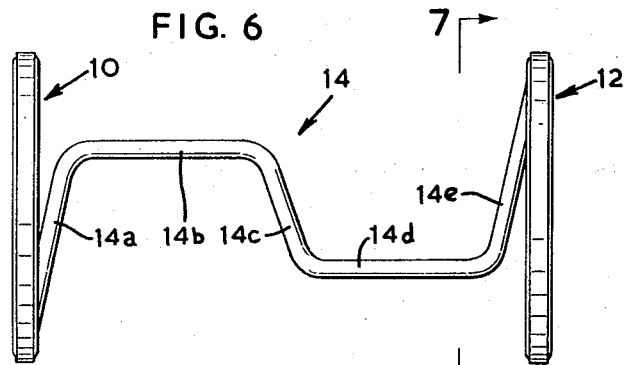
FIG. 6 is a front elevation view of a third form of the invention which is characterized by the use of solid steel rod for both the wheels and the crank mechanism and further characterized by welded attachment of the crank mechanism to the wheels.

Referring to FIG. 1, the amusement device of the invention essentially consists of a pair of spaced ground engaging wheels 10 and 12 interconnected by a crank mechanism 14. The latter also acts as a mechanism for propelling the device when a person supported thereon shifts his weight from one foot to the other while leaning slightly forward or backward. In the normal course, the operator will find it advantageous to place his feet on mechanism 14 in such manner that the heels of his shoes are pressed forward as to snugly fit against the pedal-like parts thereof. Member 14 is a one-piece item having a first portion 14a which extends from the inner circumferential face of wheel 10 in a direction which makes an angle both with the plane of wheel 10 and the theoretical axis A—A defined by the points 10a and 12a about which wheels are generated. A second part 14b extends from the free end of part 14a in a direction parallel to axis A—A to a point short of a theoretical plane parallel to and half-way between wheels 10 and 12. Part 14c extends from the end of part 14b through the point at which the mid plane just mentioned intersects axis A—A to connect with the fourth part 14d which in turn connects with the fifth part 14e, with parts 14d and 14e being similar to parts 14b and 14a, respectively.

As can be readily appreciated, parts 14b and 14d are spaced substantially the same distance from but on opposite sides of axis A—A and act as pedals with parts 14a and 14e providing the means for connecting the pedals to the wheels. Parts 14a and 14e are slanted inwardly as to space the operator's feet away from the wheels as to avoid any interference by the wheels with the operator's pant cuffs, while part 14c is sloped to space the feet somewhat apart as to avoid interference therebetween.

The other embodiments of the invention are similar to the FIG. 1 embodiment as described above in essential respects. In all embodiments, the crank mechanism 14 is a one-piece member having the various parts described above. As can be readily appreciated from the drawings, each embodiment of the invention is characterized by simplicity of construction whereby to keep manufacturing costs as low as possible. Further, it has been found that the arrangement of member 14 relative to the wheels gives the device a pleasing aesthetic appearance which is particularly intriguing to the eye when the device is operated.

Referring now to certain details of construction of the various embodiments illustrated, reference is made to FIGS. 1 and 2. In this embodiment, the wheels 10 and 12 are constructed in the manner of tricycle wheels, i.e. they comprise rims which are semi-circular in cross-section and adapted to receive solid rubber or the like composition tires 16 and 18. To provide interconnection between the parts 14a and 14e of the crank mechanism with the wheels, the latter are each provided with socket members 20 and 22 which might be fixed to the rims of the wheels as by welding or the like. The sockets are appropriately sized to snugly receive parts 14a and 14e and the latter may be fixed in place simply by friction or by welds. In the FIGS. 1 and 2 embodiment, member 14 is a tube preferably formed of steel although any material having the required structural strength could be used. The embodiment illustrated in FIGS. 3 and 4 essentially differs from the first described embodiment in the manner in which the crank mechanism is connected to the wheels although there are also differences in construction in the wheels themselves. Thus, the wheels are each formed of two circular rims having a cross-sectional shape roughly equivalent to the quadrant of a circle and carry inner flanges 26 and 28 which may be fixed together as by spot welding or the like. Each of the flanges is enlarged at one point to provide a socket adapted to receive the flattened ends of a tube forming the crank mechanism. Again, spot welding may be employed to fix the flattened ends of member 14 within these sockets.

Figure 7:
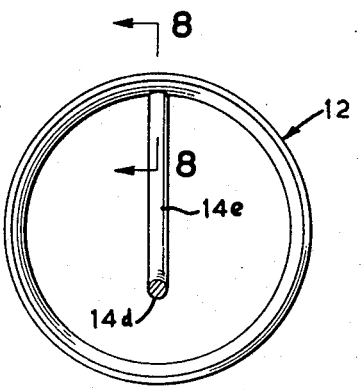
FIG. 7 is a cross-sectional view taken along the line 7—7 of FIG. 6.
Figure 8:
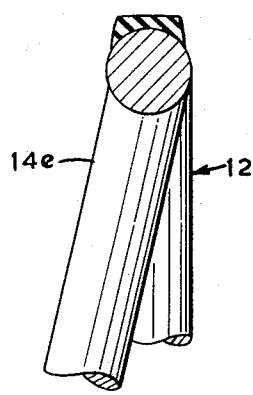
FIG. 8 is an enlarged cross-sectional view taken along the line 8—8 of FIG. 7.
Figure 9:
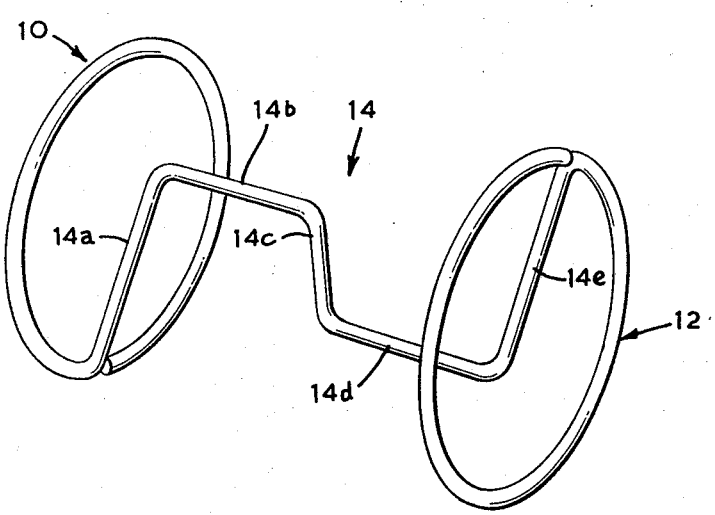
FIG. 9 is a perspective view of a fourth form of the invention which is characterized by a one-piece construction consisting of a solid steel rod having the outer ends of the crank mechanism developed into wheel forms.

FIGS. 6 and 7 show a third embodiment characterized by even greater simplicity than the embodiments of FIGS. 1 to 4 in that both the wheels and the crank mechanism 14 are steel rod members with the ends of mechanism 14 simply being welded to the inner circumferential faces of the wheels. The embodiment of FIG. 9 is an even more simple form of the invention wherein the whole device is made from one piece of rod by extending the outer ends of parts 14a and 14e into wheel forms. The embodiments of FIGS. 6 to 9 may be provided with tires as shown in FIG. 8 or they may be used without tires as shown in FIG. 9. With tires, the obvious advantage of greater traction is obtained while without tires, the lack of traction actually improves the turning ability of the device.

All four embodiments of the invention are further characterized in that the distance between the pedal portions of member 14, i.e. parts 14b and 14d, is approximately 35 to 45 percent of the diameter of the wheels. It is found that within this range an acceptable balance between the need to obtain forward motion without too much pedaling and the need to avoid too large a crank throw are both achieved. With similar devices heretofore available, the operator has either found it difficult to maintain his balance on the device due to too large a spacing between the pedal portions relative to the wheel diameter or has had to operate the device too quickly to gain any reasonable speed due to too small a distance between these pedal portions relative to the wheel diameter. In accord with this invention, it has been found that this distance between the pedal portions should ideally be approximately 39 percent of the wheel diameter and certainly within the range of 35 to 45 percent.

What we claim as our invention is:

1. An amusement device adapted to support and be propelled by a standing person; said device comprising a pair of ground engaging wheels arranged in side-by-side spaced apart relationship, said wheels having substantially the same diameter and consisting of hoop-like elements having no internal support, a crank mechanism extending between and interconnecting said wheels, said crank mechanism serving to support a person standing on the device and also serving as propelling means for the device when actuated by a person supported thereon, said crank mechanism comprising a unitary structure fixed at its ends to said hoop-like wheels; said structure having a first part extending from the point of attachment to one of said wheels in a direction forming an angle with the plane of said one of said wheels and with the axis defined by the points about which said hoop-like wheels are generated, said first part extending through said axis and terminating at a point to one side of said axis but within the cylindrical space defined by said wheels, a second part extending from the end of said first part in a direction parallel with said axis and towards the other of said wheels, said second part terminating at a point short of a theoretical plane positioned midway between said wheels and parallel to the planes of said wheels, a third part extending from the end of said second part through the point at which said theoretical plane intersects said axis and connecting with a fourth part similar to but on the opposite side of said axis from said second part, and a fifth part similar to said first part but connected to the other of said wheels, said second and fourth parts each being positioned substantially the same distance from said axis but on opposite sides thereof and each having a length adapted to accommodate a foot of a person supported thereon.

2. A device as claimed in claim 1 in which the distance between said second and fourth parts is between 35 and 45 percent of the diameter of said wheels.

3. A device as claimed in claim 2 in which the distance between said second and fourth parts is approximately 39 percent of the diameter of said wheels.

4. A device as claimed in claim 2 in which the ends of said crank mechanism are fixed to the inner circumferential faces of said wheels.

5. A device as claimed in claim 2 in which both said wheels and said crank mechanism comprise one piece of steel rod, said first and fifth parts being extended into hoop forms as to define said wheels.

6. A device as claimed in claim 2 in which said crank mechanism is formed of steel rod and in which said wheels are formed of steel rod with the outer ends of said crank mechanism being welded to the inner circumferential faces of said wheels.

7. A device as claimed in claim 6 in which the outer peripheral faces of said wheels carry friction material tires.

8. A device as claimed in claim 2 in which said wheels are standard rimmed wheels having solid rubber composition tires received in the outer peripheries thereof and further including a socket member welded to the inner circumferential faces of each of said wheels with the ends of said first and fifth parts being received in said sockets.

9. A device as claimed in claim 8 in which said crank mechanism is formed of steel tube.

10. A device as claimed in claim 2 in which said wheels are each formed of a pair of circular rims, each of which has a cross-sectional shape corresponding to a quadrant of a circle and carrying inwardly projecting radial flanges which are spot-welded together to form said wheels, a rubber composition solid tire received in the outer periphery of each of said wheels, said flanges including extended portions at one point on the inner circumferential faces of the wheels to form sockets adapted to receive the ends of said crank mechanism, said last mentioned means being formed of tubular steel and having flattened outer ends received within said sockets and spot-welded in place.

References Cited by the Examiner

UNITED STATES PATENTS

| | | | |
|---|---|---|---|
| 1,600,453 | 9/1926 | Corcoran | 280—259 |
| 3,064,495 | 11/1962 | Quillery | 74—552 |
| 3,107,926 | 10/1963 | Verge | 280—221 |

FOREIGN PATENTS

| | | |
|---|---|---|
| 641,123 | 5/1962 | Canada. |
| 991,173 | 5/1965 | Great Britain. |

KENNETH H. BETTS, *Primary Examiner.*